M. J. JOHNSON.
SYNCHRONIZING APPARATUS.
APPLICATION FILED DEC. 14, 1916.
1,234,170.
Patented July 24, 1917.
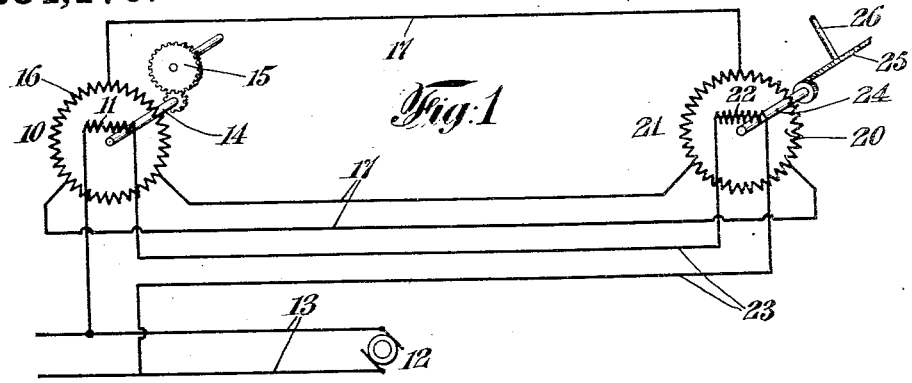
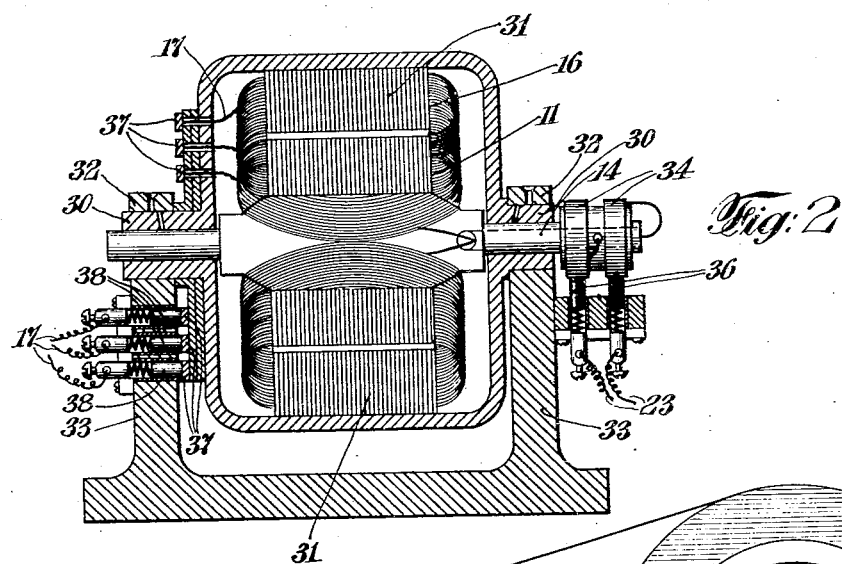
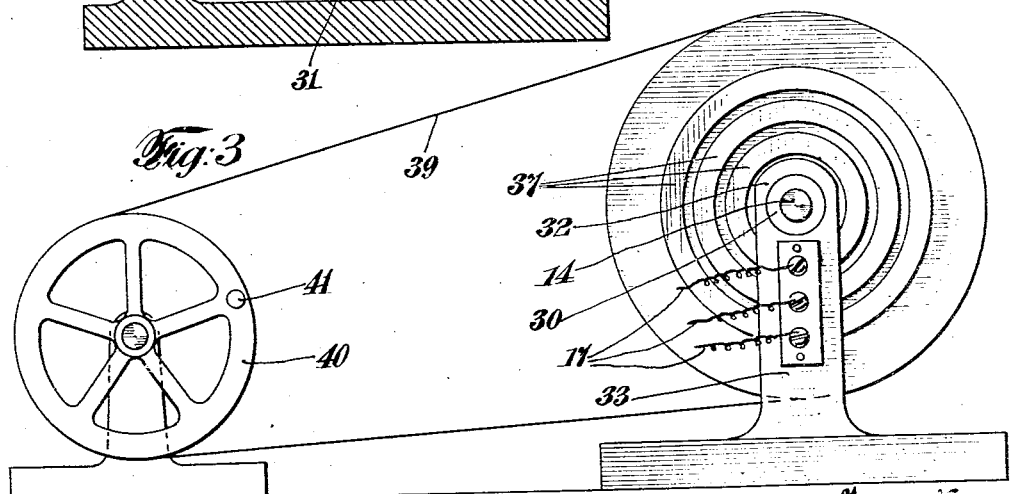
Inventor
Manfred J. Johnson
By
his Attorney

UNITED STATES PATENT OFFICE.

MANFRED J. JOHNSON, OF NAUGATUCK, CONNECTICUT, ASSIGNOR TO THE BRISTOL COMPANY, OF WATERBURY, CONNECTICUT, A CORPORATION OF CONNECTICUT.

SYNCHRONIZING APPARATUS.

1,234,170.   Specification of Letters Patent.   Patented July 24, 1917.

Application filed December 14, 1916. Serial No. 136,927.

*To all whom it may concern:*

Be it known that I, MANFRED J. JOHNSON, a citizen of the United States, and a resident of Naugatuck, in the county of New Haven and State of Connecticut, have invented certain new and useful Improvements in Synchronizing Apparatus, of which the following is a specification.

The invention relates to synchronizing apparatus, for example as embodied in connection with the simultaneous operation of a plurality of mechanisms, for example entertainment apparatus such as motion picture machines, sound reproducing machines, piano-players, musical instruments and the like. It has for its object to so control the synchronizing device that an actuating portion thereof for one of the synchronized devices may be advanced or retarded relatively to the other of said synchronized devices to correspondingly affect the former in case of failure of an operator to set both mechanisms at the proper starting points. A further object of the invention is to make it possible, after the mechanisms are in synchronous operation, to readily correct for a defect in any of the records that are being synchronized.

The nature of the invention will be best understood when described in connection with the accompanying drawings, in which—

Figure 1 illustrates diagrammatically the general arrangement of the apparatus.

Fig. 2 is a vertical section through one of the synchronizing members.

Fig. 3 is an end elevation thereof showing also the mechanical displacing means for same.

Similar characters of reference designate corresponding parts throughout the several views.

Referring to Fig. 1 of the drawings, 10 designates one of the two or more similar members constituting the synchronizing device and herein considered as the transmitting member thereof. It is shown in its simplified form as consisting of a single-phase bi-polar field or rotor 11 connected to a source of alternating current 12 through mains 13. This rotor field may be revolved in any convenient manner from one of the devices to be synchronized, as through a shaft 14 and gearing 15, if the latter be required in order to provide a suitable speed of rotation. Surrounding the rotor 11 is a stator 16 having a distributed winding which may be similar to that of an induction motor. In the present embodiment, suitable leads 17 are run from three equidistant points thereof to three similarly disposed points of a corresponding three-phase stator winding 20 of the receiving portion 21. This portion is similarly provided with a single-phase bi-polar revolving field or rotor 22 which through leads 23 is connected in series with the rotor 11 and is mounted on a shaft 24, communicating rotation directly, or, for example, through gears 25 to a driving shaft 26. This shaft is designed to rotate at the proper speed suitable apparatus connected thereto and designed to run in synchronism with the driving apparatus for the transmitting member.

This results from the fact that the alternating current prevailing in the rotor of the transmitter will induce currents, when said rotor is displaced from a neutral position, in the three wires of the stator, the relative values of which currents depend upon the position of the field or rotor. The stator coils are energized entirely by induction from the rotor, and movement of the latter produces a field in the stator which polarizes it in the direction of the rotor axis and induces voltage in the stator coils, the same being transmitted to the receiver stator coils and duplicating in them the same polarity and voltage conditions, but in reverse direction, or vice versa, according to the arrangement of the stator connections. The rotor of the receiver, in turn, being energized in the same direction as that of the transmitter, is reacted upon by the polarized stator until their magnetic axes coincide. Any difference in the position of the transmitter and the receiver rotors causes a difference of potential between them with a consequent flow of current and resultant torque, so that the receiver rotor will closely and smoothly follow the movement of the transmitter rotor.

The present invention has to do more particularly with means whereby an additional or a counter equalizing current effect may be afforded to affect one of said members, in order to increase or retard temporarily the velocity of rotation of the apparatus controlled thereby. It will be understood that in the synchronization of a plurality of mechanisms, for example entertainment devices, an error may be introduced by not setting the various mechanisms properly at the beginning of the performance; and in such event, the error would be maintained throughout. Also, where films are involved, an imperfectly mended break will cause a similar disturbance of the synchronization. Furthermore, actual errors in synchronization during productions of the records to be synchronized will result in failure to properly synchronize when reproduced, particularly in view of the fact that the synchronizing action of the device itself is so perfect that the two or more mechanisms designed to be synchronized cannot, unless suitable means are provided for this purpose, be brought out of step or the synchronization advanced or retarded.

For this purpose, a compact and convenient synchronizing device is utilized and so constructed that the retarding or advancing action aforesaid may be obtained in a simple and convenient manner. Reference being had more particularly to Figs. 2 and 3 of the drawings, it will be noted that the shaft 14 of the rotor member 11 of the transmitting portion 10 of said synchronizing device is mounted to rotate in bearings 30, which are formed as trunnions extending from the frame of the stator member 16 and carrying the poles 31. These trunnions in turn are mounted in bearings 32 of standards 33, whereby the entire stator member is capable of being rotated relatively to its rotor member. Two slip rings 34 are provided on the shaft 14 and through brushes 36 are connected with the rotor 22 and to the main 13 and leads 23. The equi-distant points of the stator member are connected to three slip rings 37 mounted on one end of the stator frame to rotate therewith, and corresponding brushes 38 supported by standards 33 bear against said slip rings and are connected to the leads 17. By this means, proper contact is insured, even though the stator member be given a rotation relatively to its rotor member, and which latter rotation may be effected in any convenient manner, for example by connecting the periphery of said frame through belt 39 with a manually rotatable pulley 40 or the like provided with a suitable handle 41 for operation.

It should be appreciated, in giving the stator member a positive or negative rotation relatively to its rotor, that is to say, effecting a mechanical displacement between the armature and field, that this will have the effect of temporarily increasing or decreasing the velocity of rotation of the receiver, and in turn correspondingly advancing or retarding the apparatus which it controls relatively to the mechanism controlling said transmitting device. Proper synchronism will be reëstablished as soon as the mechanical displacement ceases and the same is thus under the perfect control of the operator. It is to be understood, of course, that the speed of the driving shaft for the transmitter and speed of apparatus controlling same is not altered thereby, for any such change would effect merely a similar change of the speed of the apparatus controlled by the receiving device and not be relative thereto.

I claim:

1. Synchronizing mechanism, comprising: a rotatable transmitting or driving device, including a stator member and a rotor member, one of same constituting an electrical field and the other an armature; a rotatable receiver or driven device including a stator member and a rotor member, one of same constituting an electrical field and the other an armature; a source of alternating current, and electrical connections between said source and each of said devices whereby equalizing currents are produced therein when corresponding elements of said devices do not occupy corresponding positions relatively to their co-acting members; and means to effect a mechanical displacement between an armature and field of one of said devices to increase or retard temporarily the speed of rotation of said other member.

2. Synchronizing mechanism, comprising: a rotatable transmitting or driving device, including a stator member constituting an armature and a rotor field member rotatably mounted within said stator member; a rotatable receiver or driven device including a stator member constituting an armature and a rotor field member rotatably mounted within said stator member; a source of alternating current, and electrical connections between said source and each of said rotors whereby equalizing currents are produced in said stators when the rotors of said devices do not occupy corresponding positions relatively to their stators; and means to effect a mechanical displacement between an armature and field of one of said devices to increase or retard temporarily the speed of rotation of said other member.

3. Synchronizing mechanism, comprising: a rotatable transmitting or driving device, including a stator member constituting an armature and a rotor field member rotatably mounted within said stator member; a rotatable receiver or driven device including a stator member constituting an armature and a rotor field member rotatably mounted within said stator member; a source of alternating current, and electrical connections between said source and each of said rotors whereby equalizing currents are produced in said stators when the rotors of said devices do not occupy corresponding positions relatively to their stators; and means to rotate the stator or armature member of the transmitting device to increase or retard temporarily the speed of rotation of the receiver rotor.

4. Synchronizing mechanism, comprising: a rotatable transmitting or driving device, including a rotor member provided with trunnions, a stator member provided with hollow trunnions fitting over the trunnions of the rotor member, a support for said stator trunnions and providing a bearing therefor, the rotor member constituting an electrical field, and the stator member an armature; a rotatable receiver or driven device including a stator member in electrical connection with the stator member of said transmitting device, and a rotor member in electrical connection with the corresponding member of said transmitting device; a source of alternating current, and electrical connections between said source and each of said devices whereby equalizing currents are produced therein when the corresponding rotors of said devices do not occupy corresponding positions relatively to their stators; and means to rotate the stator member of the transmitting device to increase or retard temporarily the speed of rotation of the rotor of said receiving device.

5. Synchronizing mechanism, comprising: a rotatable transmitting or driving device, including a rotor member provided with trunnions, two slip rings mounted on one of said trunnions and connected with the rotor winding, a stator member provided with hollow trunnions fitting over the trunnions of the rotor member, a support for said stator trunnions and providing a bearing therefor, three slip rings mounted on said stator and connected with the stator winding, corresponding brushes mounted on said support and engaging said slip rings, the rotor member constituting an electrical field, and the stator member an armature; a rotatable receiver or driven device including a stator member in electrical connection with the stator member of said transmitting device, and a rotor member in electrical connection with the corresponding member of said transmitting device; a source of alternating current, and electrical connections between said source and each of said devices whereby equalizing currents are produced therein when the corresponding rotors of said devices do not occupy corresponding positions relatively to their stators; and means to rotate the stator member of the transmitting device to increase or retard temporarily the speed of rotation of the rotor of said receiving device.

Signed at Waterbury, in the county of New Haven and State of Connecticut this 11th day of December, A. D. 1916.

MANFRED J. JOHNSON.

Witnesses:
 WM. H. BRISTOL,
 SAMUEL R. BRISTOL.